United States Patent
Marks et al.

[19]

[11] Patent Number: 5,983,706
[45] Date of Patent: Nov. 16, 1999

[54] VERSATILE AIR TEST APPARATUS

[76] Inventors: Daniel L. Marks, 1781 Courtney Ave., Pleasanton, Calif. 94588; James L. Ruiz, 21421 Rizzo Ave., Castro Valley, Calif. 94546

[21] Appl. No.: 09/037,778

[22] Filed: Mar. 10, 1998

[51] Int. Cl.[6] ....................................................... G01M 3/28
[52] U.S. Cl. ................................. 73/37; 73/49.5; 73/49.8; 73/49.1
[58] Field of Search .............................. 73/37, 49.5, 49.1, 73/49.8

[56] References Cited

U.S. PATENT DOCUMENTS

| | | | |
|---|---|---|---|
| 3,459,229 | 8/1969 | Croft | 73/49.1 |
| 4,027,525 | 6/1977 | Mull | 73/37 |
| 4,103,537 | 8/1978 | Victor | 73/49.1 X |
| 5,548,993 | 8/1996 | Alexander | 73/49.5 |

FOREIGN PATENT DOCUMENTS

| | | | |
|---|---|---|---|
| 564899 | 10/1944 | United Kingdom | 73/37 |
| 2088567 | 6/1982 | United Kingdom | 73/37 |

*Primary Examiner*—Daniel S. Larkin
*Attorney, Agent, or Firm*—Coudert Brothers

[57] ABSTRACT

The present invention provides a single compact fitting for air, $CO_2$, or nitrogen pressure testing either gas piping or waste piping. Each fitting is used for gas pipes of a particular outside diameter and waste pipes of a single larger diameter. The typical plumber would have a set, for example four, of the inventive fittings available, one for each size waste pipe that is be tested. The inventive fitting couples easily to either gas fuel piping or waste piping. A single air-pressure gauge is used to test either type of piping system. The inventive fitting is not limited to waste, vent, or gas piping systems; it can also be used to couple to other piping systems. The inventive fitting, in addition to being more versatile than conventional air-pressure test fittings, is also smaller and more compact.

40 Claims, 5 Drawing Sheets

VERSATILE AIR TEST APPARATUS

BACKGROUND OF THE INVENTION

1. Field of the Invention

This invention relates generally to waste, vent, and gas pipe testing devices and more specifically to on-site waste, vent, and gas pipe testing devices used after building construction is completed and prior to water and gas being supplied to a building site.

2. Description of Related Art

In the past, pipe installed in a building for the purpose of bringing gas utility to the building or to removing waste from the building was tested at the time that gas and water were supplied to the site by utility services. However, in the last 7 years, there has been an increasing trend to reduce early stage real estate development costs by delaying installation of utility service until a building has a planned occupation date. In that case, the developer is faced with the problem of ensuring that the installed piping meets the Uniform Plumbing Code (UPC) for gas and waste prior the utility being supplied. This is accomplished by using pressurized air to test the integrity of the pipes.

The air testing procedure is described in the UPC book. Standards published in the 1994 UPC book must be met until January 1999. After January 1999, the standards published in the 1997 UPC book will implemented. Section 712.3 sets forth the air testing procedures and standards for waste pipe. Section 1204.3.2 sets forth the air testing procedures and standards for gas pipe.

Waste pipe systems have been air tested using an air-pressure fitting constructed to fit the standard waste plumbing pipe, having, for example, 1½", 2", 3", or 4" inside diameter (i.d.), corresponding to 2½", 2¾", 3¾", or 4¾" outside diameter (o.d.), respectively. Unless otherwise noted, when a pipe is describe as having a specific diameter, such as for example, a 4" pipe, the dimension is referring to the inside diameter (i.d.) of the pipe. The air test is made by attaching an air compressor testing apparatus to a clean-out or other suitable opening in the pipe system, closing all other inlets and outlets to the system, and forcing air into the system until there is a uniform gage pressure of five pounds per square inch (5 psi or 34.5 kpa). The outside air-pressure source is then disconnected, the 5 psi pressure must be held by the pipe system without introduction of additional air for at least 15 minutes. The pressure must be measured using a gauge having at least ⅒ pound incrementation; the range of the gauge is not limited for waste testing.

Gas pipe systems have been tested using an air-pressure fitting constructed to fit the standard gas pipe, having for example, ½", ¾", or 1½" diameters. Until 1999, the pipe system must be tested to a uniform pressure of 15 psi and held for no less than 15 minutes. The pressure is measured using a 30 pound gauge having one pound incrementation. After 1999, the pipes will be tested to a uniform pressure of not less than 10 psi and held for no less than 15 minutes with no perceptible drop in pressure. The pressure must be measured using a gauge having ⅒ pound incrementation and a range that does not exceed twice the test pressure applied, in this case 20 pounds.

Because waste and gas pipe systems have different pipe sizes and are tested to different gas pressures requiring different air gauges, the people who conduct the tests have been burdened with carrying around cumbersome air-pressure fittings, devoted to one or the other type of systems. To use an air test on a waste pipe, plumbers in the field have resorted to assembling heavy awkward devices in order to connect a small ⅜ inch air valve to a waste pipe having an inside diameter between about 1½" and about 4". Additionally, because of the awkward construction of the air-valve to waste-pipe adapters, the delicate pressure gauges are constantly breaking, as they are carried around in a bin of fittings, resulting in high replacement costs. Repairing them in the field, or making new ones is frustrating and frequently results in cut fingers from hose clamps or other parts.

A typical structure of an air-valve to waste-pipe fitting used by plumbers in the field would comprise, 1) a nipple capable of connecting on one side to an air supply and on the other side to a gas pipe; 2) a hexagonal pipe that is closed on one end, except for a hole through which the air-valve is threaded and sealed and second hole in the side through which an air gauge is fitted and sealed; 3) a round male connector pipe attached to the hexagonal pipe on one side; 4) a flange connected, on its small end to the second end of the connector, and on its wide end to a male adapter; and 5) connected to the other end of the ABS adapter a set of bushings, and gaskets, sized to adapt to the waste pipe diameter, secured in place by a corrugated hub and 2 hose clamps surrounding the rubber gasket. This arrangement of standard pieces found in a plumber's supply kit is about 14 inches long. Most of the length is taken up with adapters and connectors that increase the diameter of the fitting. This contraption serves the purpose of connecting an air valve to a waste pipe but is extremely awkward and cumbersome. Additionally, it is necessary to carry several of these around with each adapting the ⅜" air valve to a different diameter waste pipe.

It would be very desirable to have a compact sturdy unit that could also be used for air-pressure testing waste piping systems. It would be even more desirable to have a single compact unit that could also be used to air-test both waste and gas piping systems. And it would be yet more desirable to have a single compact unit that could be used to test both waste and gas piping systems without changing the pressure gauge.

SUMMARY OF THE INVENTION

It is an object of this invention to provide a compact sturdy air-test unit having an air valve on one end that couples to an air pressure source, and having coupling to waste pipe on the other end. It is a further object of the invention to provide a single compact air-test unit that can be used to air-test both waste and gas piping systems. It is still another object of the invention to provide a single compact air-test fitting, that has a single air-pressure gauge that meets the standards for both gas and waste testing, the fitting being capable of coupling to both waste and gas piping systems.

The present invention comprises an apparatus for gas-pressure testing comprising, a) at least two concentric couplings, each coupling having a diameter that is different from the others, wherein each coupling has an inside and an outside and each coupling is approximately centered on a long axis of the fitting and located so that each coupling is capable of attaching to a target pipe in the presence of the other couplings; b) a test gas inlet valve located on a portion of the long axis of the fitting that is adjacent to the outside of the coupling having the largest diameter; and c) a test gas pressure gauge located on a portion of the long axis of the fitting that is adjacent to the outside of the coupling having the larger diameter.

SUMMARY DESCRIPTION OF THE DRAWINGS

FIG. 1A: shows the inventive air test fitting, used for gas and waste piping.

FIG. 1B: shows the interior parts of the inventive air test fitting.

FIG. 2A: shows a detail view of the air inlet section.

FIG. 2B: shows a perspective view of the air inlet section.

FIG. 3: shows a detail view of the inner body.

FIG. 4: shows a detail view of the rubber cap.

DETAILED DESCRIPTION OF THE INVENTION

Figure 1A:
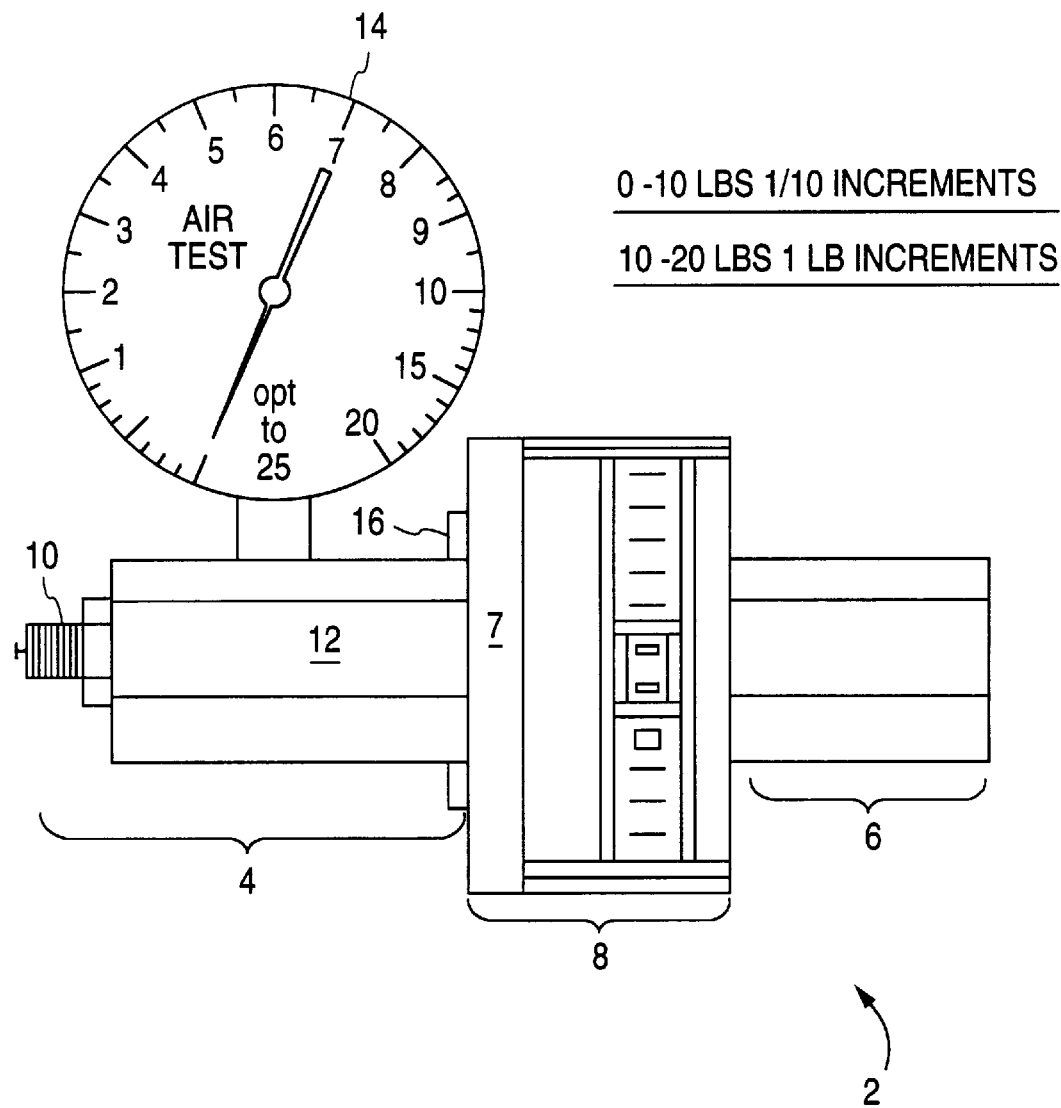

The present invention comprises an apparatus for gas-pressure testing comprising, a) at least two concentric couplings, each coupling having a diameter that is different from the others, wherein each coupling has an inside and an outside and each coupling is approximately centered on a long axis of the fitting and located so that each coupling is capable of attaching to a target pipe in the presence of the other couplings; b) a test gas inlet valve located on a portion of the long axis of the fitting that is adjacent to the outside of the coupling having the largest diameter; and c) a test gas pressure gauge located on a portion of the long axis of the fitting that is adjacent to the outside of the coupling having the larger diameter.

The present invention further comprises an apparatus for gas pressure testing comprising, a) a gas inlet section having one opening tapped to accept a gas pressure valve, a second opening tapped to accept an gas pressure gauge, and a third opening tapped to accept one end of a connector; b) a connector having a hollow core, and connected on a first side to the gas inlet section; c) an inner body section connected on an interior end to a second side of the hollow connector, the inner body section capable of coupling on its exterior end to a target pipe for gas pressure testing; and d) a cap having an inside diameter that is greater than the outside diameter of the inner body section, the cap interposed between the gas inlet section and the inner body section, wherein the cap is essentially concentric with the inner body and opens in the same direction.

In another embodiment, the present invention comprises, an apparatus for gas pressure testing comprising: a) an gas valve connected to an gas inlet section, the gas inlet section having one female end; b) a gas pressure gauge connected to the gas inlet section; c) a close nipple having a first end attached to the female end of the gas inlet section; d) a flexible cap having an opening in its top to accommodate the close nipple; and e) an inner body having a female end connected to a second end of the close nipple, and having a male end threaded to connect to a fuel gas pipe.

Further, the present invention comprises a method for conducting a gas pressure test of piping comprising the steps of: a) providing a gas source; b) providing piping to be tested (target piping); c) providing a fitting to connect the gas source to the target piping, the fitting comprising, i) at least two concentric couplings, each having a different diameter from the other, wherein each coupling has an inside and an outside and each coupling is approximately centered on a long axis of the fitting and located so that each coupling is capable of attaching to a target pipe in the presence of the other coupling; ii) a gas inlet valve located on a portion of the long axis of the fitting that is adjacent to the outside of the coupling having the larger diameter; and iii) a gas-pressure gauge located on a portion of the long axis of the fitting that is adjacent to the outside of the coupling having the larger diameter.

Figure 1B:
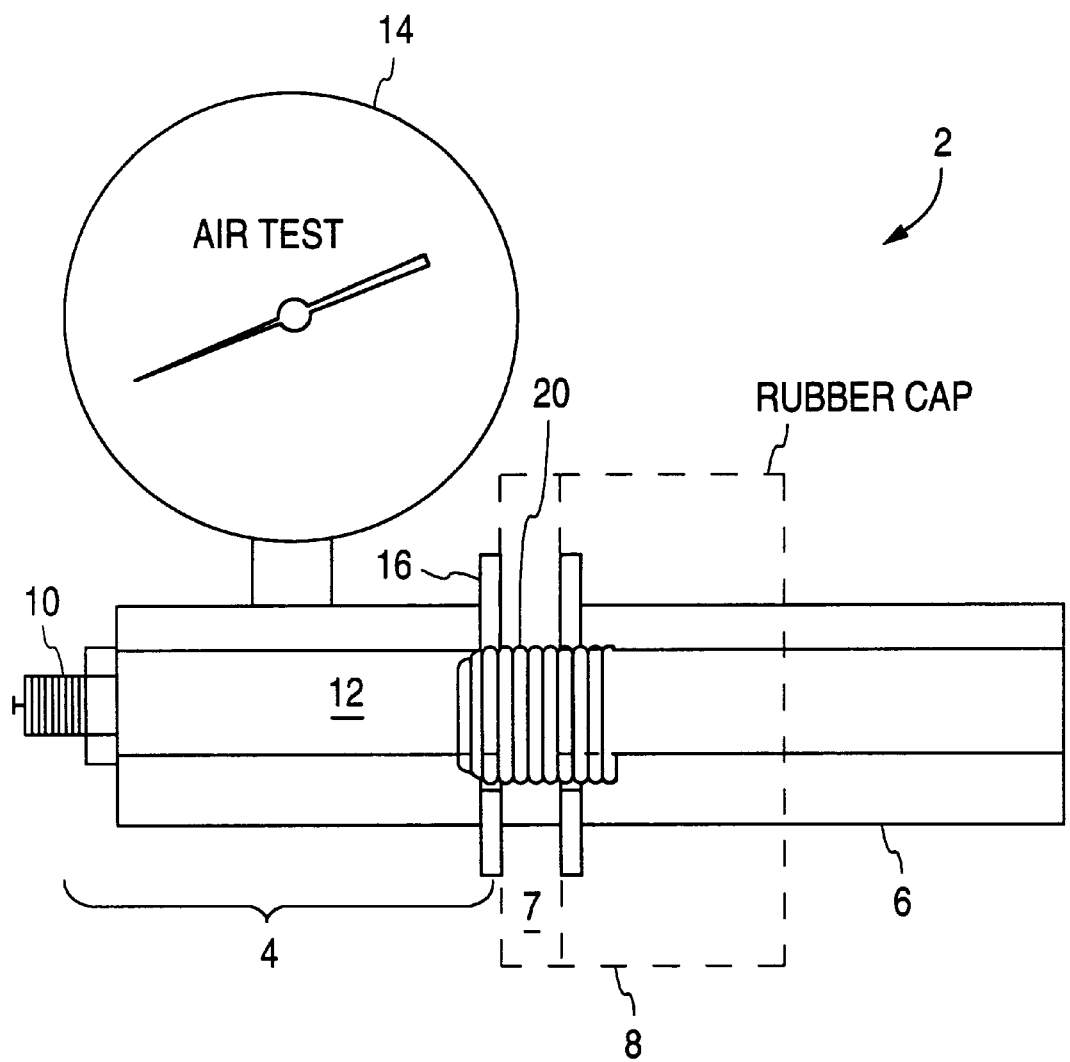

FIG. 1 shows the inventive test apparatus 2 configured to connect to either a gas fuel pipe or a waste pipe. The inventive apparatus is designed to pressure test piping with any of many suitable test gasses, for example, compressed air, manually pumped air, $CO_2$, nitrogen, and other gasses that are acceptable under the Uniform Plumbing Code. Because air is commonly used as a test gas in a pressure test, and because pressure testing with a gas is commonly referred to as "air testing" even when the test gas is not air, for example even when $CO_2$ is used, the test gas is uniformly referred to in this document as air. Thus, in this document, when reference is made to an 'air pressure gauge', an 'air inlet section', an 'air valve', or the like, it is to be understood that any suitable test gas can be substituted for 'air'. Referring to the test gas as 'air' further avoids confusion with some of the piping systems that are targeted for testing, such as those destined to carry a gas fuel such as natural gas. A piping system destined to carry gas fuel such as natural gas is commonly referred to by practitioners as 'gas pipe' or 'gas piping'. In this document the terms gas pipe, gas piping, and gas pipe system refer to piping destined to eventually carry a gas fuel.

In FIG. 1, an air inlet section 4 is shown coupled to an inner body 6 through a rubber cap 8. The cap was made of rubber for the current embodiment because rubber is believed to be the best currently available material, having both flexibility and strength. However, other materials satisfactory for the purpose of coupling to pipe for air-pressure testing (target pipe) can be substituted. For example, new plastics or even a metal having threads, could be used depending on a specific intended use and environment. In this document, cap 8 may be referred to as rubber, but other materials can be substituted if desired. The air inlet section 4 has an air valve 10 that penetrates through a solid end of an air inlet pipe 12 into the interior of the pipe. The other end of the air inlet pipe 12 is threaded as a female connector to join with a hollow male close nipple 20. Air gauge 14 penetrates into the interior of air inlet pipe 12 through its side wall. Air inlet section 4 fits firmly against the solid top portion of cap 8 via a washer or flange 16. A central hole in the top portion 7 of the cap 8 is spanned by a hollow close nipple 20. There is a tight, sealed fit between the edges of the hole in the top of the cap 8 and the nipple. The close nipple serves as a small male connector between air inlet section 4 and inner body 6, so that the pressurized air that enters air inlet section 4 through air valve 10 passes into the interior of inner body 6. The inner body section 6 has a flange or washer on one end that allows it to fit firmly against the inside wall of the top of cap 8 when screwed down tightly against air inlet section 4 via close nipple 20 and interior threads in the male end of the inner body. The other end of inner body 6 is also threaded as a female member to accept standard gas piping which has a male connector.

To conduct an air-pressure test of gas piping, pressurized air is fed in through air valve 10, passes through air inlet pipe 12, close nipple connector 20, and inner body 6 to gas piping that is connected to the exterior end of the inner body. When the target piping couples to the inner body 6, the cap 8 is not used.

The same inventive fitting that is used to air test gas piping is also used to test waste piping. Since waste piping may have any of several different diameters, a user chooses an inventive fitting that has a cap diameter that matches the diameter of the target pipe coupling. The o.d. of inner body 6 is always significantly smaller than the inner diameter of the cap 8. Thus a waste pipe will fit around the inner body and connect to the open end of the cap 8. To conduct an air-pressure test of waste piping, pressurized air is fed in through air valve 10, passes through air inlet pipe 12, close nipple connector 20, and inner body 6 to the target waste line which is sealed to cap 8.

The entire fitting is approximately six inches long. It provides the user with a great advancement in convenience during use combined with storing ease. Additionally, the inventive fitting is more versatile than air test fittings found in the prior art. The present invention comprises the first dual purpose fitting wherein a single fitting has concentrically mounted couplings so it is useful to air test both gas piping and waste piping.

Air inlet section

Figure 2A:
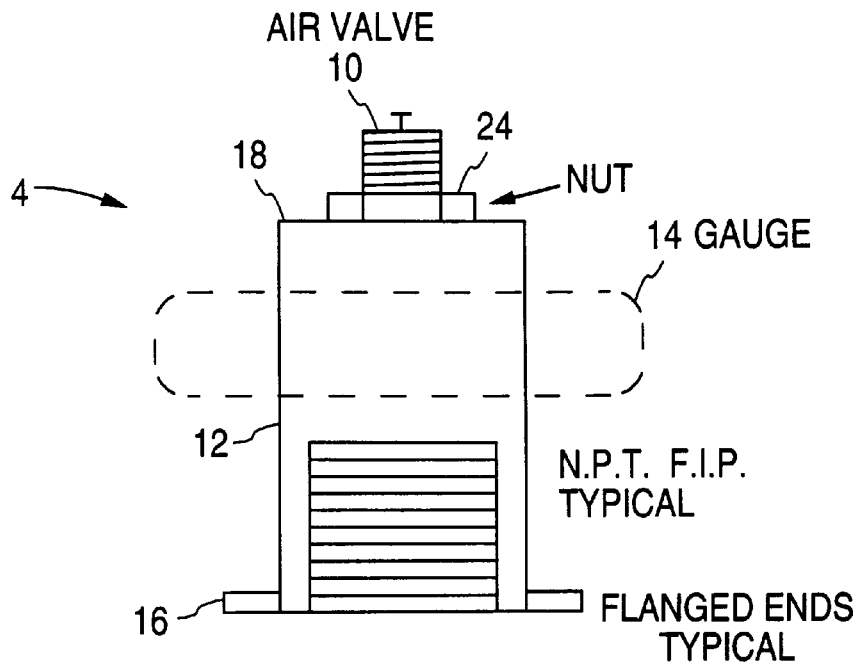
Figure 2B:
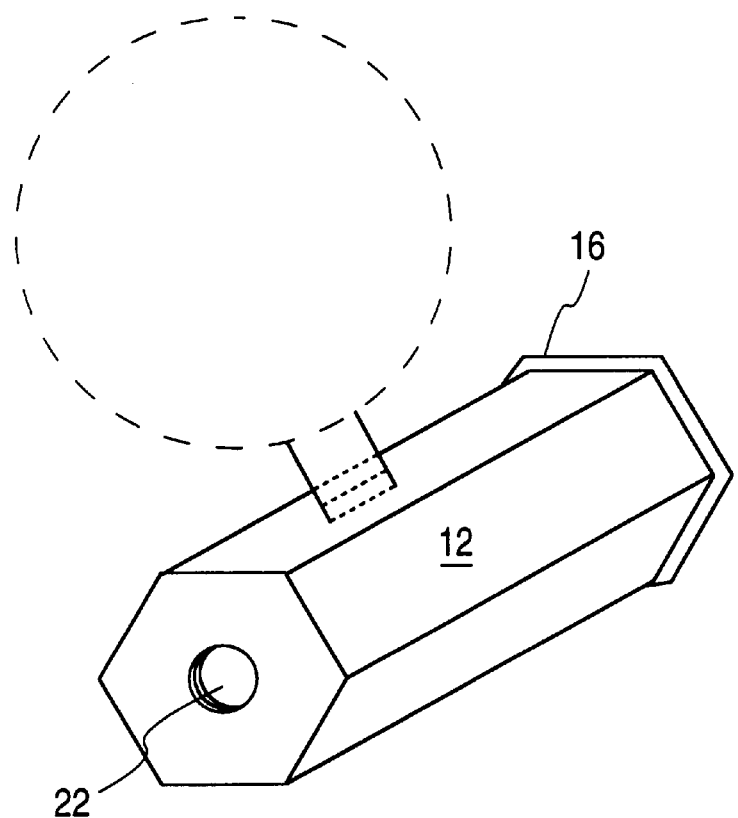

The air inlet pipe 12 is shown in FIGS. 2A and 2B. It comprises a pipe 18 having one closed end and one open end. It is convenient for the pipe 12 to be hexagonal because that provides a flat surface through which an air-pressure gauge 14 is attached, but this shape is not required for the invention. Pipe 12 can, for example, have an octagonal, round banded coupling, simple round, or other cross-sectional shape. The important point is that an air tight seal is made between pipe 12 and the air-pressure gauge 14.

The closed end 18 has a hole 22 through which an air valve is inserted. Typically, a ⅜" air valve is used, although it is not necessary to the invention. The air valve must match the air-pressure valve on the selected air source. The air valve 10 is secured to the pipe 12 in any of a number of ways generally known to practitioners. In the example shown in FIGS. 2A and 2B, a ⁵⁄₁₆" hex nut 24 was used. The other end of pipe 12 has internal NPT threads to receive a short close nipple. If, for example, a ¾ close nipple 20 is used, then the threads in the open end of pipe 12 are made ¾" NPT. In the best embodiment, flange 16 is located at the open end of pipe 12. The flange is pressed up against the top closed surface of the cap 8 to achieve an airtight fit. However, a flange is not necessary. Instead, a washer can be used to achieve a very tight fit against cap 8.

There are several alternative ways to construct air inlet section 4 that will be readily apparent to practitioners in the plumbing arts. For example, pipe 12 can be made from a piece of pipe having two open ends, one of the ends having external threads. That end can then be closed by attaching a metal cap having matching internal threads. The inventive fitting includes the many ordinary ways of constructing air inlet section 4.

A custom made air gauge 14, is used that conforms with the air testing standards for both waste and gas piping as stated in sections 712.3 and 1204.3.2, and 319.0 of the 1997 UPC. The gauge reads to 10 pounds air pressure in tenth pound incrementations and to 20 pounds air pressure in one pound incrementations between 10 pounds and 20 pounds. Of course, any gauge can be used that conforms with UPC standards in force at the time of use. The gauge described above was chosen because it meets both the current UPC standards and the those that will go into effect when the new standards are adopted, expected in 1999. After 1999, if one wanted, for example, to minimize device size, a gauge that read to 10 pounds air pressure in tenth pound incrementations could be used instead of a gauge having a 20 pound range.

The air gauge 14 is mounted through the side wall of pipe 12 using standard methods. In order to make a good airtight seal, it is preferable to mount the gauge through a flattened section on the pipe that has, for example, a hexagonal cross-section. The important feature though, is that an air tight seal is achieved.

The air inlet pipe 12 is typically about 3" long. It may, however, be considerably longer. The fittings currently used by plumbers, have an overall length of 15" and the current invention would retain inventive utility even if it was made to have an overall length of 15" or more. Making pipe 12 longer than between about 2" to about 4" would result in some loss of convenience, particularly if the overall length of the fitting became much longer than about 12". Alternatively, the inlet pipe 12 may be as short as about 1.5 or 2". It's i.d. is typically about 1" but may be between about ⅜" and about 1¼". It's o.d. is typically between about ½" and about ¾" greater than the i.d.

Typically, the air inlet pipe is made out of galvanized steel. However, it can be made from many other materials such as, for example, black steel, brass, pot metal, aluminum, or other materials known to practitioners in the art.

Inner body section

Figure 3:
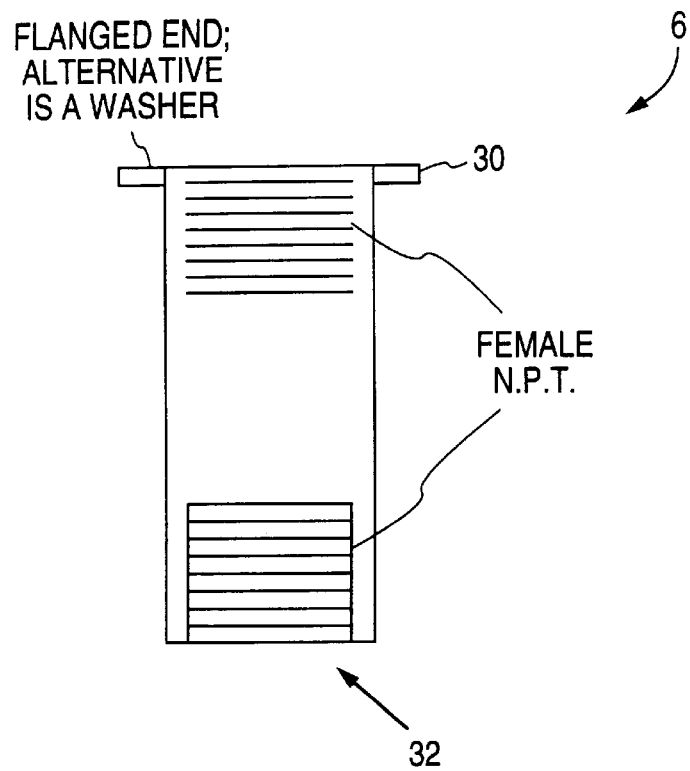

FIG. 3 shows a detail of the inner body section 6. It is open on both ends and has internal threading on one end 32 that couples to the target gas pipe. The second end has internal threading to match one side of the close nipple 20. The second end, preferably, is flanged to easily provide a tight fit next to the internal surface of the top of the cap 8. Alternatively, a flat end and washer or other means of achieving a tight fit is used.

The inner body is typically about 3" long. Like the air inlet pipe 12, it may be as long as 12" or 15" or even more, though the fitting, typically, become less convenient as it becomes longer. To provide a fitting that has a short overall length, the inner body is between about 1" and about 4". If its length is very short, it may be visually obscured by the edges of the cap 8, requiring the threaded end to be coupled to a target gas pipe by feel rather than by sight.

Inner body section 6 has an i.d. typically of about 1" but may be between about ¼ and about 2". Its i.d. is, typically, chosen to match the target gas pipe with which it is intended to couple, but an adapter can be used to increase the number of target pipe diameters to which a single inner body can couple. Standard gas pipes have o.d.s of ¼", ⅜", ½", ¾", 1", 1½", or 2". There are of course other sizes but this list includes the most common. The i.d. of inner body 6 is, typically, about 1.5". The o.d. is, typically, between about ½" and about ¾" greater than the i.d., but is not so limited.

The preferred method of constructing inner body section 6 comprises a) providing a piece of pipe having the appropriate dimensions and one flanged end; b) tapping the flanged end to match male connector 20; and c) tapping the other end with internal threads that couple to target gas piping. An alternate construction, also found to perform in a satisfactory manner comprises using a section of externally threaded pipe having two flat ends and an o.d. that matches the target gas pipe's i.d. The interior end 30, that is the end that will fit up against the inside surface of the cap 8, is internally taped to match male connector 20. A flange or appropriately shaped internally threaded ring is screwed on to interior end 30. A connector that is internally threaded to match both the exterior threading of the pipe and the target gas pipe is screwed onto the pipe's other end. Practitioners of ordinary skill in the art will be able to discern a large variety of equivalent ways to assemble individual sections without departing from the spirit and scope of the present invention.

Inner connector section

The air inlet section 4 and inner body 6 are connected through the center of cap 8. There are many types of connectors that can be used. A ¾" close nipple 20, provides a convenient connector for the present embodiment. Alternatively, a compression fitting or other connecting element may be used. To maintain good air flow dynamics, it is preferred that the i.d. of the connector matches that of the air source. The connector attaches on one side to the open end of the air inlet pipe 12 and on the other side to the interior end 30 of the inner body 6.

Rubber cap

Figure 4A:
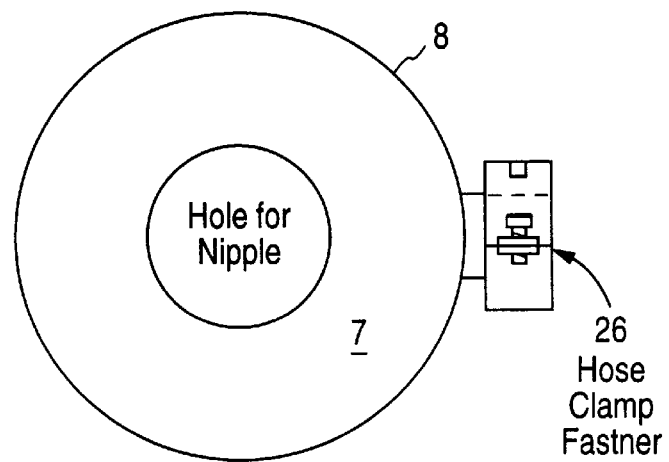
Figure 4B:
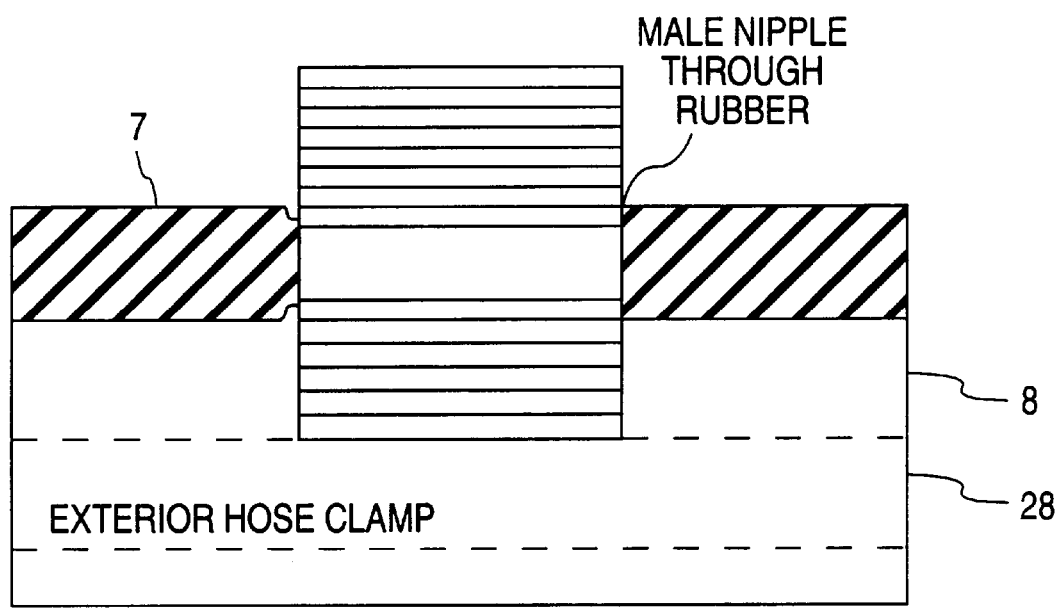

FIG. 4 shows a cap 8, which is sized to couple to a target waste, vent, second gas pipe, or other pipe having a diameter larger than the gas pipe targeted by the inner body. It is likely that the cap 8 will be most commonly used to couple to a waste or vent pipe. Cap 8 may be formed from a standard waste or vent pipe cap, or more preferably, a thick version is used that will wear better and will hold the air pressure well. The cap is secured around the target pipe using a securing means. A hose clamp 26, shown in FIG. 4, illustrates one means of securing the cap to a target pipe. More than one clamp can be used in some instances, particularly for large caps, without departing from the spirit of the invention. It is helpful, though not necessary, to provide indentations 28, grooves, tabs, or other means of holding one or more hose clamps in place as they are tightened.

The diameter of the hole in the top 7 of the cap 8 is made slightly smaller than the o.d. of close nipple 20, so that when the close nipple is pushed through the hole, the edges of the hole compresses against and firmly grips the outside of the nipple, making a good seal. Nipple 20 shown in FIG. 1B, had an o.d. of 1" and an i.d. of ¾". Thus a ⅞" hole was made in the top of cap 8 to accept close nipple 20.

While the cap is, typically, made of rubber, it may be made of any material, including plastics, that meets UPC standards, and is flexible and strong. For example, other materials satisfactory for the purpose of coupling to the target pipe such as new plastics or even a metal cap having threads can be substituted for rubber.

After the close nipple is inserted through the hole in the closed top of the cap 7, air intake section 4 is screwed on to the top side of the cap and inner body 6 is screwed into the underside of the cap. In another embodiment, the cap couples to the inside of the waste pipe. In this embodiment the outside diameter of the cap seals against the inside diameter of the waste pipe. After the cap is inserted into the waste pipe it is sealed against the inside of the waste pipe using any of a number of commonly available mechanical means, such as an expansion bolt. Other flexible materials besides that of a waste cap can be used, as long as the requirement of strength and flexibility and capability to make a good seal are met.

Thus, the invention provides a single compact fitting for air-pressure testing pipes having different diameters, such as for example gas piping and waste piping. The fitting couples to target piping through either the inner body 6, or cap 8, which are arranged essentially concentrically on the fitting and which open in the same direction. Each fitting is made to couple to, for example, a gas pipe of a particular o.d. and waste pipes of a single larger diameter. A typical plumber would likely have a set of adapters to allow the gas pipe fitting to attach to any of several possible gas pipe diameters. Still, the typical plumber would have a set, for example four, of the inventive fittings available, wherein the set of four fittings would each have, for example, a 1½", a 2", a 3", and a 4" cap 8, one for each size waste pipe, vent, or other pipe coupling that is targeted for air-pressure testing. That is, in a particular embodiment, the inner body would couple to, for example, a ¾" gas pipe or other pipe and cap 8 would, for example, couple to a 2" waste pipe, vent pipe, second gas pipe, or other piping. Without compromising compactness, standard adapters may be used to couple the ¾" inner body to other sizes of target piping.

The inventive fitting couples easily to either a gas piping or a waste pipe. A single gas-pressure gauge is used to test both piping systems. The inventive fitting, in addition to being more versatile than conventional fittings because it couples to conventional gas fuel and waste piping, is also sturdier and more compact than the fittings plumbers have been making conventionally. In addition, in several of its embodiments the inventive fitting is less expensive to make than the fittings plumbers have been making conventionally. In some embodiments the cost of production has been reduced by a factor of between four, five, six, and even seven.

The description of illustrative embodiments and best modes of the present invention is not intended to limit the scope of the invention. Various modifications, alternative constructions and equivalents may be employed without departing from the true spirit and scope of the appended claims.

We claim:

1. An apparatus for gas-pressure testing comprising:
   a) at least two concentric couplings, each coupling having a diameter that is different from the others, wherein each coupling has an inside and an outside and each coupling is approximately centered on a long axis of a fitting and located so that each coupling is capable of attaching to a target pipe in the presence of the other couplings;
   b) a test gas inlet valve located on a portion of the long axis of the fitting that is adjacent to the outside of the coupling having the largest diameter; and
   c) a test gas pressure gauge located on a portion of the long axis of the fitting that is adjacent to the outside of the coupling having the larger diameter.

2. The apparatus of claim 1 wherein the overall length of the fitting is less than 20 inches.

3. The apparatus of claim 1 having an overall length of between about 4 inches and about 15 inches.

4. The apparatus of claim 1 having an overall length of between about 5 inches and about 12 inches.

5. The apparatus of claim 1 having an overall length of between about 6 inches and about 9 inches.

6. The apparatus of claim 1 wherein the gas is chosen from the group consisting of air, nitrogen, and $CO_2$.

7. The apparatus of claim 1 wherein the larger of the at least two concentric couplings is configured to nest inside a waste pipe and form a high pressure seal thereto.

8. An apparatus for gas pressure testing comprising:
   a) a hollow test gas inlet section having one opening tapped to accept a test gas pressure valve, a second opening tapped to accept a test gas pressure gauge, and a third opening tapped to accept one end of a connector;
   b) a connector having a hollow core, and connected on a first side to the test gas inlet section;
   c) a hollow inner body section connected on an interior end to a second side of the hollow connector, the inner body section capable of coupling on its exterior end to a target pipe; and
   d) a cap having an inside diameter that is greater than the outside diameter of the inner body section, the cap interposed between the gas inlet section and the inner body section, wherein the cap is essentially concentric with the inner body and opens in the same direction.

9. The apparatus of claim 8 wherein a test gas pressure valve is attached to the test gas inlet section.

10. The apparatus of claim 9 wherein the gas valve is attached through an opening in an end of the air inlet section.

11. The apparatus of claim 8 wherein a gas pressure gauge is attached to the gas inlet section.

12. The apparatus of claim 11 wherein the gas pressure gauge is attached through a side of the air inlet section.

13. The apparatus of claim 11 wherein the gas pressure gauge has a range of 0 to 20 pounds pressure and the first 10 pounds have 0.1 pound incrementations.

14. The apparatus of claim 8 wherein the gas inlet section comprises a pipe having one closed end and one internally tapped female end.

15. The apparatus of claim 14 wherein the female end is flanged.

16. The apparatus of claim 8 wherein the inner body section comprises a pipe having one female end and one male end.

17. The apparatus of claim 16 wherein the female end is flanged.

18. The apparatus of claim 17 wherein the male end is threaded to match gas piping.

19. The apparatus of claim 8 wherein the cap comprises a flexible, durable material.

20. The apparatus of claim 19 wherein the cap is made of rubber.

21. The apparatus of claim 20 wherein the cap further comprises hose clamps attached to its outside circumference.

22. The apparatus of claim 8 having an overall length that is less than about 20 inches.

23. The apparatus of claim 22 having an overall length of between about 4 inches and about 15 inches.

24. The apparatus of claim 22 having an overall length of between about 5 inches and about 12 inches.

25. The apparatus of claim 22 having an overall length of between about 6 inches and about 9 inches.

26. The apparatus of claim 8 wherein the test gas is chosen from the group consisting of air, nitrogen, and $CO_2$.

27. An apparatus for test gas pressure testing comprising:
   a) a test gas valve connected to a hollow test gas inlet section, the gas inlet section having one female end;
   b) a test gas pressure gauge connected to the gas inlet section;
   c) a hollow close nipple having a first end attached to the female end of the gas inlet section;
   d) a flexible cap having an opening in its top, through which the close nipple is threaded; and
   e) a hollow inner body having a female end connected to a second end of the close nipple, and having a male end threaded to connect to a fuel gas pipe.

28. The apparatus of claim 27 wherein the gas valve and the gas pressure gauge are each attached through a flat portion of the gas inlet section.

29. The apparatus of claim 28 wherein the gas pressure gauge has a range of 20 pounds and the first 10 pounds have 0.1 incrementations.

30. The apparatus of claim 27 wherein the cap is comprised of rubber and has hose clamps to compress it around a pipe fitting.

31. The apparatus of claim 27 wherein the overall length is between about 4 inches and about 12 inches.

32. The apparatus of claim 30 wherein the rubber cap couples to a pipe having a 2 inch inside diameter.

33. The apparatus of claim 32 wherein the inner body couples to a male NPT pipe having a ¾ inch inside diameter.

34. The apparatus of claim 27 wherein an adapter is connected to the male end of the inner body.

35. The apparatus of claim 25 wherein the gas is chosen from the group consisting of air, nitrogen, and $CO_2$.

36. The apparatus of claim 27 wherein the cap is comprised of a flexible material and fits inside a target pipe fitting.

37. The apparatus of claim 36 wherein an expansion bolt is used to form a high pressure seal between the cap and the target pipe that surrounds the cap.

38. A method for conducting a gas pressure test of piping comprising the steps of:
   a) providing a test gas source;
   b) providing piping to be tested;
   c) providing a fitting to connect the gas source to the target piping, the fitting comprising,
      i) at least two concentric couplings, each coupling having a different diameter that is from the others, wherein each coupling has an inside and an outside and each coupling is approximately centered on a long axis of the fitting and located so that each coupling is capable of attaching to a target pipe in the presence of the other couplings;
      ii) a test gas inlet valve located on a portion of the long axis of the fitting that is adjacent to the outside of the coupling having the largest diameter; and
      iii) a test gas-pressure gauge located on a portion of the long axis of the fitting that is adjacent to the outside of the coupling having the larger diameter.

39. The method of claim 38 wherein the gas is chosen from the group consisting of air, nitrogen, and $CO_2$.

40. The method of claim 38 wherein the fitting has an overall length of less than about 20 inches.

* * * * *